Figure 1:
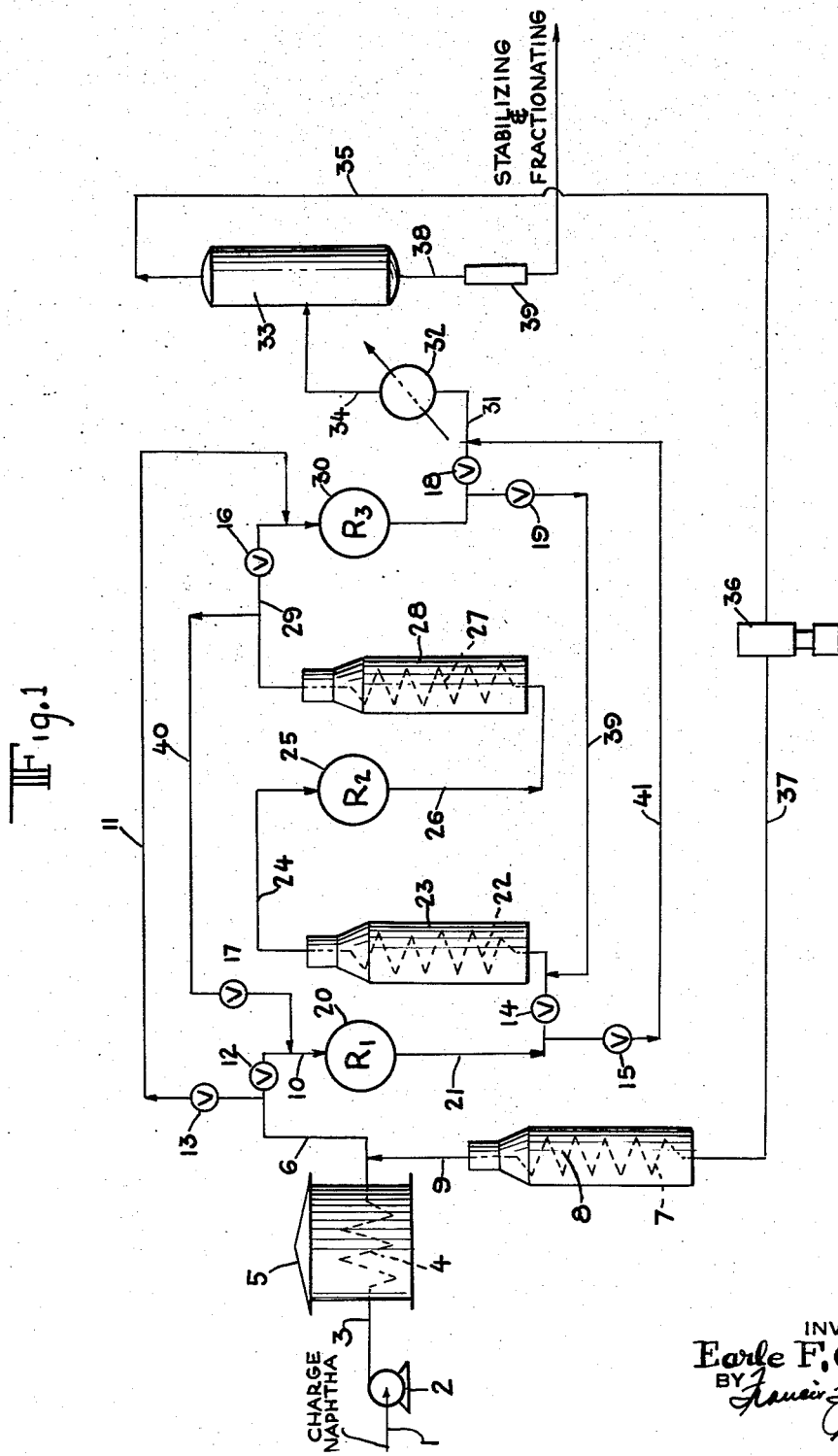

July 5, 1960

E. F. GINTER 2,944,000

METHOD OF EXTENDING ONSTREAM PORTION OF CYCLE DURING
REFORMING BY REVERSING DIRECTION OF FLOW

Filed April 11, 1958

2 Sheets-Sheet 1

INVENTOR
Earle F. Ginter
BY Francis Johnston
AGENT

July 5, 1960  E. F. GINTER  2,944,000
METHOD OF EXTENDING ONSTREAM PORTION OF CYCLE DURING
REFORMING BY REVERSING DIRECTION OF FLOW
Filed April 11, 1958  2 Sheets-Sheet 2

INVENTOR
Earle F. Ginter
BY
AGENT

2,944,000
METHOD OF EXTENDING ONSTREAM PORTION OF CYCLE DURING REFORMING BY REVERSING DIRECTION OF FLOW

Earle F. Ginter, Woodbury, N.J., assignor to Socony Mobil Oil Company, Inc., a corporation of New York Filed Apr. 11, 1958, Ser. No. 727,939

10 Claims. (Cl. 208—65)

The present invention relates to the reforming of naphthas employing static beds of catalyst in two or more reactors through which the naphtha passes serially and, more particularly, to the reforming of naphthas employing static beds of catalyst in two or more reactors through which the naphtha passes serially during an onstream period of 1 to 365 days.

During recent years in striving for a more economical means for producing the high octane gasolines now required by the modern motor vehicle, greater amounts of naphthas are being reformed over particle-form reforming catalysts employed as static beds in two or more reactors. The catalysts employed are well-known to those skilled in the art and may be divided into two classes, i.e., (1) those which require regeneration after relatively short onstream periods of less than 24 hours, and (2) those which require regeneration only after much longer onstream periods of several days to several months. One of the members of the latter class of particle-form reforming catalysts is the platinum-type particle-form reforming catalysts which produce practical conversions for as long as 2 years. However, it is generally customary to shut the unit down at least once a year for inspection and such repairs as cannot be made while the unit is onstream.

The onstream time of the immediately foregoing type of reforming catalysts, which are often loosely designated "non-regenerable" catalysts, is dependent upon the maximum reactor temperature to which the catalyst can be subjected without losing activity and/or selectivity and the temperature at which thermal conversions occur whichever is the lower temperature. As a consequence of the foregoing considerations a temperature of about 1000° F. is the maximum to which a platinum-type catalyst, e.g., a particle-form reforming catalyst comprising about 0.1 to about 10 percent, preferably about 0.3 to about 2 percent platinum by weight, and the balance alumina with small amounts of halogen about equal to the weight percent platinum, can be subjected. However, the weight percent of halogen can be either higher or lower than the weight percent platinum. As the activity of the catalyst decreases during use the temperature of the vapor at the vapor inlet to at least the first reactor is raised until the inlet temperature reaches the maximum as determined by the considerations set forth hereinbefore. Thus, assuming that with fresh or regenerated catalyst at a given reactor pressure within the range 100 to 1000 p.s.i.g. and at a given space velocity within the range 1–10 v./hr./v. (volume of liquid feed per hour per unit volume of catalyst) the vapor inlet temperature is 940° F. to produce under the aforesaid assumed conditions of pressure and space velocity a gasoline of the required octane rating. Assuming that the maximum permissible reaction temperature is 980° F., and assuming that the vapor inlet temperature must be raised 1° F. per day to maintain the severity required to produce gasoline of the aforesaid octane rating then the onstream period will be about $$\frac{980° - 940°}{1° D} = \frac{40}{1} = 40 \text{ days}$$

It is conventional to employ a plurality of adiabatic reactors, usually three, but as many as 12, reheating the effluent of all but the last reactor in the series to reaction temperature before introducing the effluent of one reactor into the next reactor in series. During the onstream period a carbonaceous deposit is laid down on the catalyst particles. The onstream period is to a preponderant extent limited by the amount of the carbonaceous deposit (hereinafter designated coke) laid down on the catalyst. It has been found that under any given set of operating conditions the amount of coke deposited on the catalyst in a plurality of reactors will vary and increase in amount from the first to the last reactor in the series. Thus, in a three-reactor unit operating under conditions to produce a gasoline having an octane number of 104 (Research + 3 cc. TEL) the amount of coke laid down on the catalyst varied as shown in Table I.

Table I

Feed:
   Straight run naphtha.
   B.R., 180° to 380° F.
Catalyst:
   0.6 percent by weight platinum.
   0.6 percent by weight chlorine.
   Balance alumina.
Number of reactors: 3.
Overall Space Velocity: 1/v./hr./v.
Catalyst Distribution in Reactors: 1:1:1.

| Reactor No. | Relative Amount of Catalyst | Coke, Percent by Weight |
|---|---|---|
| 1 | 1 | 4 |
| 2 | 1 | 18 |
| 3 | 1 | 21 |

Onstream time: 277 days.

Similarly, when the catalyst is distributed among the three reactors in the ratio of 1:0.8:2 the coke distribution is as follows:

Table II

| Reactor No. | Relative Amount of Catalyst | Coke, Percent by Weight |
|---|---|---|
| 1 | 1 | 1 |
| 2 | 0.8 | 7 |
| 3 | 2 | 16 |

Onstream time: 180 days.

The data presented in Tables I and II clearly establish that more coke is deposited in the third reactor than in the second. These data also establish that more coke is deposited in the second reactor than in the first reactor.

Another factor which limits the onstream period is the amount of coke laid down on the catalyst. From this it follows that the onstream period is limited to the time required to deposit the maximum permissible amount of coke. Since coke is deposited most rapidly in the last reactor of the series, the onstream period is limited by the time required to deposit the maximum permissible amount of coke in one reactor, i.e., the last in the series. Hence, while the coke deposit in one reactor is at the permissible limit, the coke deposit in the other reactors is less than that requiring regeneration. Nevertheless, the unit must be taken off stream and all reactors regenerated.

Figure 2:
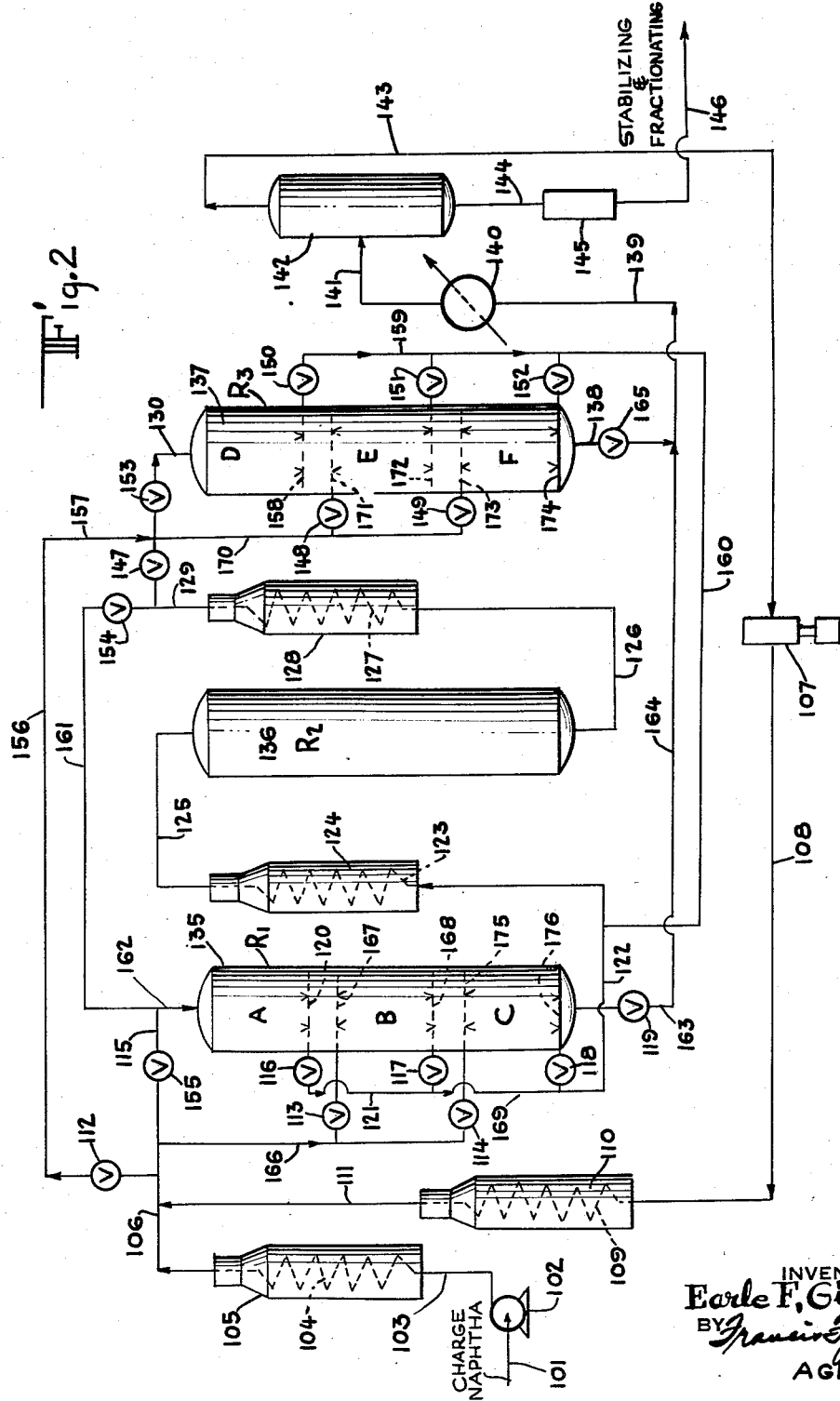

The present invention provides a means for increasing the onstream period during reforming by providing more equal distribution of the coke deposit in all of the reactors. Accordingly, it is an object of the present invention to reform naphtha and by varying the position of the reactors in the serial flow of the naphtha to be reformed lay down substantially equal proportion of coke in each reactor. It is another object of the present invention to reform naphtha in three adiabatic reactors $R_1$, $R_2$ and $R_3$ in which the flow of naphtha for a period of time is through the reactors in the order $R_1$ to $R_2$ to $R_3$ and in the next period the flow through the reactors is in the order $R_3$ to $R_2$ to $R_1$ and reversal of the flow of naphtha in a cyclic manner is continued until the catalyst in all of the reactors have about the same concentration of coke. It is a further object of the present invention to reform naphtha in three adiabatic reactors $R_1$, $R_2$ and $R_3$ in which the flow of naphtha is through the reactors in the order $R_1$ to $R_2$ to $R_3$ until the coke deposited in reactor $R_3$ reaches a concentration of about 1 to 20 percent by weight after which the flow of naphtha is reversed to be from $R_3$ to $R_2$ to $R_1$ until the concentration of the coke deposited in reactor $R_1$ is substantially the same as that of $R_3$, and reversing the flow of naphtha through reactors $R_1$, $R_2$ and $R_3$ in a cyclic manner until the concentration of coke in each reactor is about the same. It is also an object of the present invention to reverse the flow of naphtha and hydrogen-containing recycle gas when the coke deposited in the last reactor amounts to about 20 to about 70 percent of the maximum permissible coke deposit therein. It is also within the contemplation of the present invention to reverse the flow of naphtha and hydrogen-containing gas after each 8 to 12° F. increase in the vapor inlet temperature required for maintaining a given severity. Other objects and advantages of the present invention will become apparent to those skilled in the art from the following description taken in conjunction with the drawings in which Figure 1 is a flowsheet illustrating the flow of naphtha and hydrogen-containing gas through three reactors in series each containing about the same quantity of platinum-type catalyst; and Figure 2 is a flowsheet illustrating the flow of naphtha and hydrogen-containing gas through three reactors in series, each containing about the same quantity of platinum-type catalyst. The catalyst fill in the first and third reactors is divided into a plurality of beds, each containing that amount of catalyst necessary to produce a maximum temperature drop between the vapor inlet temperature and the temperature of the bed effluent when that reactor is the first reactor in the reaction train.

In Figure 1 reactors 20, 25 and 30 are filled with substantially the same quantity of catalyst to provide the designed space velocity (v./hr./v.). Charge naphtha containing not more than about 50 p.p.m. of sulfur, not more than about 2 p.p.m. of nitrogen, and not more than about $5 \times 10^{-3}$ p.p.m. of arsenic either as a result of a decontaminating treatment or as raw naphtha, flows from a source not shown through pipe 1 to the suction side of pump 2. Pump 2 discharges the charge naphtha at a pressure higher than the pressure in reactor 20 into pipe 3 through which the charge naphtha flows to coil 4 in heater 5. In heater 5 the charge naphtha is heated to a reaction temperature dependent upon the activity of the catalyst, the space velocity, and the required octane of the produced gasoline. For a particle-form reforming catalyst comprising about 0.6 percent by weight platinum, about 0.6 percent by weight chlorine, and the balance alumina, reaction temperatures of about 850° to about 980° F. are satisfactory at space velocities of about 0.5 to 4 v./hr./v. to produce gasolines having octane numbers (Research + 3 cc. TEL) in excess of 90. The heated charge naphtha flows from coil 4 to conduit 6. In conduit 6 the charge naphtha is mixed with hydrogen-containing gas, usually recycle gas containing at least about 40 to 95 percent of hydrogen, at at least reaction temperature flowing from coil 7 in heater 8 through conduit 9. The hydrogen-containing gas is mixed with the charge naphtha in the ratio of about 1 to about 15 mols, preferably about 6 to 10, of hydrogen per mol of charge naphtha to form a charge mixture.

Dependent upon which reactor of reactors 20 and 30 has the lower concentration of coke the heated charge mixture flows through conduit 6 to conduits 10 or 11.

Assuming that the concentration of coke on the catalyst in reactor 20 is lower than the concentration of coke on the catalyst in reactor 30, the charge mixture flows to reactor 20. In order to pass the charge mixture serially through the reactors in series in the order reactor 20 to reactor 25 to reactor 30 the valves are set as set forth hereinafter in Table III.

*Table III*

| Open Valves | Closed Valves |
|---|---|
| 12 | 13 |
| 14 | 15 |
| 16 | 17 |
| 18 | 19 |

With the valve settings as given in Table III the charge naphtha flows from conduit 6 into conduit 10 thence through reactor 20. The effluent from reactor 20 flows through conduit 21 (valve 14 open; valve 15 closed) to coil 22 in heater 23.

In heater 23 the effluent from reactor 20, hereinafter designated first effluent, is heated to a reaction temperature usually at least equal to that at which the charge mixture enters reactor 20. However, the temperature of the first effluent entering reactor 25 can be lower or higher than the temperature of the charge mixture entering reactor 20. The first effluent flows from heater 23 through conduit 24 to reactor 25. The effluent of reactor 25, hereinafter designated second effluent, flows from reactor 25 through conduit 26 to coil 27 in heater 28.

In heater 28 the second effluent is heated to a reaction temperature usually about the same as the temperature at which the charge mixture enters reactor 20. Nevertheless, the temperature of the second effluent entering reactor 30 can be higher or lower than the temperature of the charge mixture entering reactor 20 or the first effluent entering reactor 25. The second effluent flows from heater 28 through conduit 29 (with valve 16 open) to reactor 30. The effluent from reactor 30, hereinafter designated final effluent, flows from reactor 30 through conduit 31 (with valve 18 open; valve 19 closed) to cooler 32. Heat exchangers wherein the final effluent is in indirect heat exchange with cooler process streams, e.g., charge naphtha can be interposed between reactor 30 and cooler 32. In cooler 32 the final effluent is cooled at the pressure existing in separator 33 to a temperature at which $C_4$ and heavier hydrocarbons predominantly are condensed. The condensed final effluent and the uncondensed final effluent flow from cooler 32 through conduit 34 to liquid-gas separator 33.

In liquid-gas separator 33 the uncondensed final effluent comprising hydrogen and $C_3$ and lighter hydrocarbons generally is separated from the $C_4$ and heavier hydrocarbons at substantially reactor pressure. The separated, uncondensed final effluent, hereinafter designated recycle gas, flows from separator 33 through conduit 35 to the suction side of compressor 36. In compressor 36 the recycle gas is compressed to a pressure higher than the pressure in reactor 20. The recompressed recycle gas flows from compressor 36 through conduit 37 to coil 7 in heater 8 where the recycle gas is heated to a temperature such that when mixed with the charge naphtha in the proportions set forth hereinbefore (1:1 to 15:1) to form a charge mixture, the charge mixture has the desired reaction temperature. From coil 7 the heated recycle gas flows through conduit 9 to conduit 6.

The condensed final effluent, hereinafter designated condensate, comprising $C_4$ and heavier hydrocarbons together with dissolved hydrogen and light hydrocarbons flows from separator 33 through pipe 38 under control of pressure reducing valve 39 to stabilizing and fractionating equipment.

After the unit has been onstream a period of time dependent upon the severity of the reforming conditions existing in reactors 20, 25, and 30 the concentration of coke on the catalyst in reactor 30 will be greater than the concentration of coke on the catalyst in reactor 20. When that condition exists, i.e., when the coke deposit on the catalyst in reactor 30 is about 2 to about 10 times the coke deposit on the catalyst in reactor 20 or at intervals such as set forth hereinbefore, the direction of the flow of charge mixture is reversed. When operating under conditions of temperature and space velocity required to make a gasoline having an octane number (Research + 3 cc. TEL) of about 95 over a platinum-type catalyst containing about 0.6 percent by weight platinum, about 0.6 percent by weight chlorine, and the balance alumina, the direction of the flow of charge mixture is reversed after about 1 to about 365 days. When a gasoline having an octane number (Research + 3 cc. TEL) of about 100 is being made over the same catalyst the direction of the flow of the charge mixture is reversed after about 1 to about 300 days.

To reverse the direction of the flow of charge mixture the valves are set as shown in Table IV.

Table IV

| Open Valves | Closed Valves |
|---|---|
| 13 | 12 |
| 19 | 18 |
| 17 | 16 |
| 15 | 14 |

The flow of charge mixture then is from conduit 6 to conduit 11 (valve 13 open) and through conduit 11 to conduit 29 and reactor 30. The effluent from reactor 30, designated first reverse effluent hereinafter, flows from reactor 30 through conduit 31 to conduit 39 (valve 19 open). The first reverse effluent flows through conduit 39 to conduit 21 (valve 14 closed) and thence to coil 22 in heater 23. From heater 23 the first reverse effluent flows through conduit 24 to reactor 25. The effluent from reactor 25, hereinafter designated second reverse effluent, flows from reactor 25 through conduit 26 to coil 27 in heater 28. From coil 27 the second reverse effluent flows through conduit 29 to conduit 40 (valve 16 closed). The second reverse effluent flows through conduit 40 to conduit 10 (valve 17 open) and thence to conduit 10 and reactor 20. The effluent from reactor 20, hereinafter designated final reverse effluent, flows from reactor 20 through conduit 21 to conduit 41 (valve 15 open) and thence to conduit 31. The final reverse effluent flows through conduit 31 to cooler 32. The condensed and uncondensed final reverse effluent flows to separator 33 where the recycle gas separates from the condensate. The recycle gas flows to compressor 36 and back to heater 8 as described hereinbefore. The condensate flows from separator 32 to stabilizing and fractionating equipment as described hereinbefore.

In Figure 2 is illustrated the application of the principles of the present invention to a reforming unit employing three adiabatic reactors each containing substantially the same amount of platinum-type catalyst in which the temperature of the charge is maintained above the autogenous quench point as defined in co-pending application Serial No. 682,361, filed September 6, 1957, in the name of Anthony E. Potas, until at least about 80 percent of the naphthenes present in the charge naphtha originally is dehydrogenated.

As defined in the aforesaid co-pending application Serial No. 682,361, the autogenous quench point is that point in the reaction at which, although there are naphthenes present in the reactor contents which have not been dehydrogenated, the dehydrogenation reaction for all practical purposes ceases. The temperature of the autogenous quench point varies with the age or activity of the catalyst, the vapor inlet temperature, and the composition of the charge naphtha but the autogenous quench point is independent of the age of the catalyst, the vapor inlet temperature and the mol ratio of hydrogen-to-naphtha charged.

As set forth in the aforesaid co-pending application, it is desirable to use the minimum amount of catalyst required to produce the maximum temperature differential between the vapor inlet temperature and the temperature of the autogenous quench point in the first reactor. The minimum amount of catalyst required to produce the maximum temperature differential between the vapor inlet temperature and the temperature of the autogenous quench point is about 2 to 5, usually about 3 to 4 tons of the platinum catalyst containing 0.6 percent by weight of platinum described hereinbefore per 10,000 barrels of naphtha per day.

Since in many units employing three adiabatic reactors each filled with about the same quantity of platinum-type catalyst the catalyst charge to each reactor is a multiple of the amount of catalyst required to produce the aforesaid maximum temperature differential between the vapor inlet temperature and the autogenous quench point, provision is made to pass the charge mixture through only the required portion of the catalyst fill of the first reactor in the series to produce the aforesaid maximum temperature differential. Accordingly, to apply the principles of the present invention to such an installation the first and last reactors in the series are piped for introduction of the charge naphtha at a plurality of points and for removal of the first effluent at a plurality of points depending upon the ratio between the total amount of catalyst in each of the first and last reactors and 2 to 5, preferably 3 to 4 tons of catalyst per 10,000 barrels of naphtha charged per day. Thus, when each of the first and last reactors in the series is designed to hold 12 tons of catalyst and it is necessary to contact the charge naphtha with 4 tons of catalyst to obtain the advantages set forth in the aforesaid co-pending application, the first and last reactors of the series are piped to provide three beds of 4 tons each for each 10,000 barrels of naphtha charged per day. Figure 2 is illustrative of such an installation to which the principles of the present invention are applied as hereinafter described in conjunction with Figure 2.

In Figure 2 the first and last reactors are piped for contact of the naphtha with less than the total catalyst bed in each of the reactors. Thus, provision is made for applying the principles of the invention described in the aforesaid co-pending application Serial No. 682,361. While the first and last reactors shown in Figure 2 are piped for division of the catalyst bed into three beds one of which is used to provide the minimum amount of catalyst required to produce the maximum temperature differential between the vapor inlet temperature and the autogenous quench point temperature when the reactor is used as the first reactor in the series, it will be understood by those skilled in the art that the first and last reactors in the series are piped to divide the total catalyst bed into a plurality of beds each containing 2 to 5, preferably 3 to 4 tons of catalyst per 10,000 barrels of charge naphtha per day. Thus, depending upon the total catalyst charge in the first and last reactors each of the first and last reactors is piped to provide one, two, three or even five or six beds depending upon the capacity of the reactors. Thus, a reactor having a catalyst charge of 20 tons is piped to provide, preferably 5 to 6 beds of 4 to 3 tons each.

Thus, naphtha having suitably low concentrations of the contaminants, sulfur, nitrogen and arsenic as described hereinbefore flows from a source not shown through pipe 101 to the suction side of pump 102. The charge naphtha is discharged by pump 102 into pipe 103 at a pressure sufficiently higher than the pressure in reactor 135 to compensate for the pressure drop through the equipment downstream of the pump to separator 142 which operates at a pressure less than that of the reactor 137 by the amount of the pressure drop between reactor 137 and separator 142.

The charge naphtha flows through pipe 103 to coil 104 in heater 105. The charge naphtha is heated in coil 104 to a reaction temperature dependent upon the activity of the catalyst, the required octane rating of the gasoline produced and other variables well-known to those skilled in the art. The heated charge naphtha flows from coil 104 to conduit 106.

Hydrogen-containing gas, usually hydrogen-containing recycle gas containing at least about 40 percent hydrogen, pumped by compressor 107 through conduit 108 to coil 109 in heater 110 is heated in coil 109 to at least reaction temperature. The heated hydrogen-containing gas flows from coil 109 through conduit 111 to conduit 106 where it is mixed with the heated charge naphtha in the ratio of about 1 to about 15, preferably about 6 to 10, mols of hydrogen per mol of charge naphtha to form a charge mixture having the required reaction temperature.

Assuming the original start-up of the unit comprising reactors 135, 136 and 137, and further assuming that reactor 135 is to be used as the first in the series, the charge mixture flows to reactor 135. In order to pass the charge mixture through section A of the catalyst bed in reactor 135 and then through all of the catalyst in reactors 136 and 137, the valves are set as tabulated in Table V.

Table V

| Open Valves | Closed Valves |
|---|---|
| 155 | 112 |
| 116 | 113 |
| 147 | 114 |
| 153 | 117 |
| 165 | 118 |
|  | 119 |
|  | 154 |
|  | 148 |
|  | 149 |
|  | 150 |
|  | 151 |
|  | 152 |

With valves 112, 113 and 114 closed the charge mixture flows through conduits 115 and 162 to reactor 135. With valves 117, 118 and 119 closed and valve 116 open the charge mixture flows through conduits 115 and 162 and through section A of the catalyst bed in reactor 135 to collector 120. The effluent from bed A in reactor 135, hereinafter designated first effluent, flows from collector 120 through conduit 121. The first effluent flows from conduit 121 to conduit 122 and thence through conduit 122 to coil 123 in heater 124.

In heater 124 the first effluent is heated to a reaction temperature which is usually the same as the temperature of the charge mixture at the inlet to reactor 135 but can be higher or lower. From heater 124 the reheated first effluent flows through conduit 125 to reactor 136.

The reheated first effluent flows downwardly through the catalyst bed in reactor 136 to the vapor outlet of reactor 136. The effluent from reactor 136, hereinafter designated second effluent, flows from reactor 136 through conduit 126 to coil 127 in heater 128.

In heater 128 the second effluent is reheated to a reaction temperature the same as, or higher or lower than, the temperature of the reheated first effluent entering reactor 136. From heater 128 the reheated second effluent flows through conduit 129 to conduit 130 to reactor 137 (valves 154, 148 and 149 closed; valves 147 and 153 open).

The reheated second effluent flows downwardly through the catalyst bed in reactor 137 to the reactor vapor outlet 138 (valve 165 open; valve 119 closed). The effluent from reactor 137, hereinafter designated final effluent, flows from reactor 137 through conduits 138 and 139 to cooler 140.

In cooler 140 the final effluent is cooled to a temperature at which the $C_4$ and heavier hydrocarbons are condensed at the pressure existing in liquid-gas separator 142. The uncondensed final effluent, comprising hydrogen and $C_3$ and lighter hydrocarbons, together with the condensed final effluent, comprising $C_4$ and heavier hydrocarbons, flow through conduit 141 to separator 142.

In separator 142 the uncondensed final effluent now designated recycle gas is separated and flows therefrom through conduit 143 to compressor 107. Compressor 107 raises the pressure of the recycle gas to the pressure required to pump the recycle gas through heater 110 into conduit 106.

The condensed final effluent, now designated condensate, flows from separator 142 through conduit 144 and pressure reducing valve 145 to pipe 146 and thence to stabilization and fractionation.

When the concentration of coke on the catalyst in reactor 137 is about 1 to about 20 percent by weight or when the vapor inlet temperature to the first reactor has been raised 8° to 12° F. to maintain the severity necessary to produce gasoline having the required octane rating or as otherwise regulated as set forth hereinbefore a cycle of the onstream period is complete. When using a platinum-type catalyst comprising about 0.6 percent platinum by weight, about 0.6 percent chlorine by weight, and the balance alumina, about 1 to about 300 days are required for the coke deposit to amount to the aforesaid 1 to about 20 percent by weight dependent upon severity and pressure of operation.

When the cycle is completed as described hereinbefore, the direction of flow of the charge mixture is reversed by closing valves 155, 147, 148, 149, 151, 152 and 165 and opening valves 112, 119, 153, 150 and 154 (see Table VI).

Table VI

| Open Valves | Closed Valves |
|---|---|
| 112 | 155 |
| 153 | 113 |
| 150 | 114 |
| 154 | 116 |
| 119 | 117 |
|  | 118 |
|  | 147 |
|  | 148 |
|  | 149 |
|  | 151 |
|  | 152 |
|  | 165 |

The flow of heated charge mixture then is as follows: From conduit 106 the charge mixture flows through conduit 156 to conduit 157. From conduit 157 the heated charge mixture flows through conduit 130 to reactor 137. The charge mixture flows downwardly through that portion of the catalyst bed designated D to collector 158 (valve 150 being open). The effluent of reactor 137, now designated first reverse effluent, flows from collector 158 through conduit 159 to conduits 160 and 122 and thence to coil 123 in heater 124.

In heater 124 the first reverse effluent is reheated to a reaction temperature such as described for the first effluent. The reheated first reverse effluent flows from heater 124 through 125 to reactor 136. The reheated first reverse effluent flows downwardly through the bed of catalyst in reactor 136. The effluent of reactor 136, now designated second reverse effluent, flows from reactor 136 through conduit 126 to coil 127 in heater 128.

In heater 128 the second reverse effluent is reheated to a reaction temperature such as described for the second effluent hereinbefore. From heater 128 the reheated second reverse effluent flows through conduit 161 to conduit 162 (valves 147 and 155 closed; valve 154 open) and thence to reactor 135. The reheated second reverse effluent flows downwardly through reactor 135 to the vapor outlet 163 (valve 119 open) thereof. The effluent from reactor 135, now designated final reverse effluent, flows through conduit 163 to conduit 164 (valve 165 closed). The final reverse effluent flows through conduit 164 to conduit 139 and cooler 140. The flow and manipulation of the final reverse effluent in cooler 140 and subsequent thereto is substantially the same as that to which the final effluent of the first cycle of the onstream period was subjected. When the concentration of coke in reactor 135 is equal to or higher than that in reactor 137 the second cycle of the onstream period is completed. The second cycle is usually of about the same duration as the first cycle.

Reversal of the flow of the charge naphtha is continued in a cyclic manner until the concentration of coke on the catalyst in all reactors is substantially the same and about 5 to 30 percent by weight. When the concentration of coke in all reactors is about 5 to 30 percent by weight of the catalyst the onstream period is completed and the catalyst in all of the reactors is regenerated.

It is to be noted that the same or different sections of the catalyst beds in reactors 135 and 137 can be used in the different cycles of the onstream period when the reactor is the first in the series. Thus, the intermediate section B of the catalyst bed in reactor 135 can be used by closing valves 112, 155, 116, 114, 118 and 119 and opening valves 113 and 117. The flow is then through conduits 106 and 166 to distributor 167, the intermediate section B of the catalyst bed to collector 168, conduit 169 and conduit 122 to coil 123. From coil 123 the flow is as described in the first cycle.

Similarly, the bottom section F of the catalyst bed in reactor 137 can be used in a fourth cycle when the direction of flow is reversed by closing valves 147, 153, 148, 150, 151 and 165 and opening valves 149 and 152. The flow is then from conduit 106 through conduits 156, 157 and 170 to distributor 173. From distributor 173 the charge mixture flows downwardly through the bottom section F of the catalyst bed in reactor 137 to collector 174 and conduit 159. The effluent of reactor 137 then flows through conduit 159 (valves 150 and 151 closed; valve 152 open) to conduits 160 and 122 (valves 116, 117 and 118 closed) to coil 123 in heater 124. The flow from heater 124 is as described in the second cycle.

The intermediate section E of the catalyst bed in reactor 137 can also be used when reactor 137 is the first in the series by closing valves 147, 153, 149, 150, 152 and 165 and opening valves 148 and 151. The flow of charge mixture then is from conduit 106 to conduits 156, 157, and 170 to distributor 171, downwardly through section E of the catalyst bed to collector 172, thence through conduit 159 to conduits 160 and 122 to coil 123 (116, 117 and 118 closed).

The bottom section C of the catalyst bed in reactor 135 can be used when this reactor is the first in the series by closing valves 112, 155, 113, 116, 117 and 119 and opening valves 114 and 118. The flow of charge mixture then is from conduit 106 to conduit 166 to distributor 175 downwardly through the catalyst section C to collector 176 thence through conduits 169 and 122 to coil 123 in heater 124 (valve 119 closed).

The foregoing has been a description of a method of reforming naphtha wherein a naphtha is reformed, preferably over a platinum-type catalyst in a plurality of adiabatic reactors, wherein the effluent of all reactors except the last in the series is reheated to a reaction temperature prior to introduction into the next succeeding reactor in the series, wherein a carbonaceous deposit designated coke is laid-down on the catalyst during the onstream period and removed by combustion in a stream of combustion-supporting gas during a regeneration period, wherein the amount of coke deposited on the catalyst in each reactor of the series varies dependent upon the position of the reactor in the series and is greater in the last reactor of the series than in the first reactor in the series, and wherein the onstream period is completed when the coke deposited on the catalyst in the last reactor in the series is about 5 to about 30 percent by weight of the catalyst and the improvement in the aforesaid method of reforming naphtha wherein the direction of flow of the charge naphtha through the aforesaid plurality of adiabatic reactors in series from reactor 1 to and through reactor $n$ until the coke deposited in reactor $n$ is not more than about 1 to about 20 percent by weight of the catalyst in reactor $n$ or after about 1 to about 300 days onstream, or after each 8°–12° F. increase in the vapor inlet temperature necessary to maintain the required severity to produce gasolines having the same octane rating, then reversing the direction of flow of the charge naphtha to flow said charge naphtha from reactor $n$ to and through reactor 1 until the coke deposited in reactor 1 is not more than about 1 to about 20 percent by weight of the catalyst in reactor 1 or after about 1 to about 300 days, or after each 8°–12° F. increase in the vapor inlet temperature necessary to maintain the required severity to produce gasolines having the same octane rating, and in a cyclic manner reversing the direction of flow of charge naphtha through said plurality of adiabatic reactors until the coke deposited in each reactor of the series is substantially the same.

I claim:

1. In the method of reforming naphtha wherein naphtha and hydrogen-containing gas are passed as a charge mixture sequentially through a plurality of adiabatic reactors, wherein the charge mixture is heated to reaction temperature between successive reactors, wherein a carbonaceous deposit designated coke is laid down on the catalyst in each reactor, wherein the amount of coke laid down in the last reactor of the series is greater than the amount of coke laid down in the first reactor of the series with respect to the direction of flow of said charge mixture, and wherein the length of the onstream period for all of said plurality of reactors is controlled by the length of the onstream period of the last reactor of the series and the maximum amount of coke which can be burned off the catalyst in a stream of combustion-supporting gas during a regeneration period, the improvement which comprises in a cyclic manner passing charge naphtha and hydrogen-containing gas in series flow through a plurality of adiabatic reactors $R_1$ to $R_n$ from $R_1$ to $R_n$ until the coke deposited on the catalyst in reactor $R_n$ is about 20 to about 70 percent of the amount of coke requiring regeneration, reversing the direction of flow of said charge naphtha and said hydrogen-containing gas through said plurality of adiabatic reactors by passing said charge naphtha and said hydrogen-containing gas through said plurality of reactors sequentially from $R_n$ to $R_1$ until the coke deposited in reactor $R_1$ is at least equal to the coke deposited in reactor $R_n$, and in a cyclic manner continuing to reverse the direction of flow of said charge mixture of naphtha and said hydrogen-containing gas until the coke deposit in all reactors of said plurality of reactors is substantially the same and not greater substantially than the amount of coke requiring regeneration.

2. The improvement set forth and described in claim 1 wherein three reactors are used.

3. The improvement set forth and described in claim 1 wherein three reactors are used, the reforming catalyst is a platinum-type reforming catalyst comprising about 0.6 percent by weight of platinum, about 0.6 weight percent chlorine and the balance alumina, and wherein the direction of flow of said charge naphtha and hydrogen-containing gas is first reversed when the coke deposited on the catalyst in the third reactor is about 1 to about 20 percent by weight of the catalyst in said third reactor.

4. The improvement set forth and described in claim 3 wherein the direction of flow of charge naphtha and hydrogen-containing gas is first reversed after 1 to 300 days.

5. The improvement set forth and described in claim 3 wherein the direction of flow of charge naphtha and hydrogen-containing gas is reversed after each about 8° to about 12° F. increase in the vapor inlet temperature necessary to maintain the required severity to produce gasoline having the same octane rating.

6. In the method of reforming naphtha wherein naphtha and hydrogen-containing gas are passed as a charge mixture sequentially through a plurality of adiabatic reactors, $R_1$ to $R_n$, each containing an amount of catalyst which is a multiple of the amount of catalyst required in the first reactor to obtain a maximum temperature differential between the vapor inlet temperature of the first reactor relative to the direction of flow of said charge mixture and the temperature of the autogenous quench point, wherein said charge mixture is heated to a reaction temperature between successive reactors, wherein a carbonaceous deposit designated coke is laid down on the catalyst in each reactor, wherein the amount of coke laid down in the last reactor, $R_n$, relative to the direction of flow of said charge mixture is greater than the amount of coke laid down in the first reactor, $R_1$, relative to the direction of the flow of said charge mixture, and wherein the length of the onstream period for all of said plurality of reactors is controlled by the length of the onstream period of the said last reactor, $R_n$, and the maximum amount of coke which can be burned-off the catalyst in a stream of combustion-supporting gas during a regeneration period, the improvement which comprises contacting said charge mixture in the first reactor $R_1$ relative to the direction of flow of said charge mixture with only a portion of the catalyst fill equivalent to the minimum amount of catalyst required to produce maximum temperature differential between the vapor inlet temperature of said first reactor and the temperature of the autogenous quench point and with substantially all of the catalyst in each of the other reactors of said plurality of adiabatic reactors until the coke laid down in the last reactor, $R_n$, of said reactors relative to the direction of flow of said charge mixture is not greater than about 50 percent of the amount of coke requiring regeneration, reversing the direction of flow of said charge mixture through said plurality of adiabatic reactors to flow said charge mixture from $R_n$ to $R_1$, contacting said charge mixture in reactor $R_n$ with only a portion of the catalyst fill equivalent to the minimum amount of catalyst required to produce a maximum temperature differential between the vapor inlet temperature of said reactor $R_n$ and the temperature of the autogenous quench point and with substantially all of the catalyst in the other reactors in said plurality of adiabatic reactors until the amount of coke deposited in reactor $R_1$ is substantially equal to the amount of coke deposited in reactor $R_n$, and in a cyclic manner continuing to reverse the direction of flow of said charge mixture until the amount of coke deposited in all reactors is substantially equal.

7. The improvement set forth and described in claim 6 wherein each of said reactors is filled with an amount of platinum-type catalyst which is a multiple of 2 to 5 tons of catalyst per 10,000 barrels of charge naphtha per day, and said charge mixture is contacted in the first reactor in each cycle with about 2 to 5 tons of catalyst per 10,000 barrels of charge naphtha per day.

8. The improvement set forth and described in claim 6 wherein the platinum-type catalyst comprises about 0.6 percent by weight of platinum, about 0.6 percent by weight of chlorine, and the balance alumina.

9. The improvement set forth and described in claim 6 wherein each of said reactors is filled with an amount of platinum-type catalyst comprising about 0.6 percent by weight platinum, about 0.6 percent by weight chlorine, and the balance alumina which is a multiple of 2 to 5 tons of catalyst per 10,000 barrels of charge naphtha per day, and said charge naphtha is contacted in the first reactor in each cycle with about 2 to 5 tons of catalyst per 10,000 barrels of charge naphtha per day.

10. In the method of reforming naphtha wherein naphtha and hydrogen-containing gas are passed as a charge mixture in series flow through a plurality of adiabatic reactors, wherein the charge mixture is heated to reaction temperature between successive reactors, wherein a carbonaceous deposit designated coke is laid down on the catalyst in each reactor, wherein the amount of coke laid down in any later reactor of the series is greater than the amount of coke laid down in any earlier reactor of the series, and wherein the length of the onstream period for all of the said plurality of reactors is controlled by the length of the on-stream period of the reactor in which the greatest amount of coke is deposited, the improvement which comprises in a cyclic manner passing charge naphtha and hydrogen-containing gas in series flow through a plurality of adiabatic reactors until the amount of coke deposited in the reactor wherein the greatest amount of coke is deposited is about 20 to about 70 percent of the amount of coke requiring regeneration, changing the flow sequence of said reactors while maintaining sequential flow to deposit the smallest amount of coke in the reactor having the greatest amount of coke until the coke deposit in all of said plurality of reactors is substantially the same and not greater substantially than the amount of coke requiring regeneration.

References Cited in the file of this patent
UNITED STATES PATENTS

| | | |
|---|---|---|
| 2,773,014 | Snuggs et al. | Dec. 4, 1956 |
| 2,863,822 | Sage | Dec. 8, 1958 |
| 2,866,744 | Askey et al. | Dec. 30, 1958 |